(12) United States Patent
Jaldelid et al.

(10) Patent No.: US 10,688,862 B2
(45) Date of Patent: Jun. 23, 2020

(54) AIR GUIDE FOR A VEHICLE FRONT STRUCTURE

(71) Applicant: Volvo Car Corporation, Göteborg (SE)

(72) Inventors: Michael Lönn Jaldelid, Älvangen (SE); Mikael Torgilsson, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/298,168

(22) Filed: Mar. 11, 2019

(65) Prior Publication Data

US 2019/0315223 A1    Oct. 17, 2019

(30) Foreign Application Priority Data

Apr. 13, 2018    (EP) .................................. 18167279

(51) Int. Cl.
| | |
|---|---|
| *B60K 11/08* | (2006.01) |
| *B60R 19/12* | (2006.01) |
| *F01P 11/10* | (2006.01) |
| *B60R 19/52* | (2006.01) |

(52) U.S. Cl.
CPC ............ *B60K 11/085* (2013.01); *B60R 19/12* (2013.01); *F01P 11/10* (2013.01); *B60R 2019/527* (2013.01)

(58) Field of Classification Search
CPC .................................................. B60K 11/085
See application file for complete search history.

(56) References Cited

U.S. PATENT DOCUMENTS

| | | | | |
|---|---|---|---|---|
| 9,676,422 | B2 * | 6/2017 | Schmidt ............... | B62D 25/085 |
| 2001/0027883 | A1 | 10/2001 | Sasano et al. | |
| 2011/0000728 | A1 | 1/2011 | Mildner | |
| 2012/0019025 | A1 * | 1/2012 | Evans .................. | B60K 11/085 |
| | | | | 296/193.1 |
| 2013/0223980 | A1 * | 8/2013 | Pastrick ............... | B60K 11/085 |
| | | | | 415/1 |
| 2016/0052559 | A1 * | 2/2016 | Schmidt ................ | B60K 11/08 |
| | | | | 296/193.1 |
| 2016/0131020 | A1 | 3/2016 | Bui | |

OTHER PUBLICATIONS

Aug. 15, 2018 European Search Report issue on International Application No. EP18167279.

* cited by examiner

*Primary Examiner* — John D Walters
*Assistant Examiner* — James J Triggs
(74) *Attorney, Agent, or Firm* — Clements Bernard Walker; Christopher L. Bernard (57) ABSTRACT

An air guide for a vehicle front structure, the air guide is mountable on the vehicle front structure and is configured to redirect an incoming air flow towards a cooling device of the vehicle, the air guide including: a frame portion including a fixation portion having mounting elements for mechanical fixation to a vehicle structure when mounted for use, the frame portion is adapted to reinforce the air guide and define the general shape of the air guide, an air guide material, wherein the frame portion is over-molded with the air-guide material, wherein the stiffness of the frame portion is higher than the stiffness of the air guide material.

7 Claims, 6 Drawing Sheets

AIR GUIDE FOR A VEHICLE FRONT STRUCTURE

CROSS-REFERENCE TO RELATED APPLICATION

The present patent application/patent claims the benefit of priority of co-pending European Patent Application No. 18167279.1, filed on Apr. 13, 2018, and entitled "AN AIR GUIDE FOR A VEHICLE FRONT STRUCTURE," the contents of which are incorporated in full by reference herein.

TECHNICAL FIELD

The present invention generally relates to an air guide for a vehicle front structure, and to a method for manufacturing such an air guide.

BACKGROUND

Safety in the automotive industry is of high importance both with respect to vehicle-pedestrian impacts and vehicle-vehicle impacts. Most modern vehicles today have relatively advanced safety systems including airbags for protection of occupants of the vehicle, and external sensors on the vehicle to provide collision warnings or even automatic braking when a collision can be predicted.

Apart from electronic safety systems, the structure of the vehicle itself may also be particularly designed to behave in a predetermined way in case of an impact with a foreign object or a pedestrian. This applies for example to the front structure of the vehicle.

The front structure of a vehicle may include a bumper and a crash beam. The crash beam may often be designed to deform in a predetermined way in order to absorb the energy from a collision, for instance via the inclusion of "crash boxes". Further, the front structure often includes a radiator, a shutter, and an air guide behind a grille, where the air guide is configured to redirect incoming air flow towards the radiator via the shutter.

The components of the front structure, including the radiator, the shutter, and the air guide, adds stack up in the driving direction of the vehicle and therefore also possess an increased risk of severe damages on the vehicle itself but also on foreign objects, or injuries on and pedestrians in case of a low speed collision.

US2016/0131020 describes one example of an air guide that attempts to reduce the damages caused by the air guide to the frontal structures of the counter colliding vehicle in case of an impact, for the benefit of insurance companies. The air guide described in US2016/0131020 includes a structure for telescopic crushing of the air guide in case of impact. The telescopic crushing is enabled by folds in the walls of the air guide. In addition, the air guide described in US2016/0131020 is assembled from several sections that are fitted inside each other. An assembly of several air guide sections fitted in each other may lead to air leakage in the air guide between the sections. Furthermore, the manufacturing of the air guide disclosed in US2016/0131020 is relatively complicated with its folds and several sections.

Accordingly there is room for improvements in air guides for vehicles that reduce the risk of damages or injuries in case of collision.

SUMMARY

In view of above, it is an object of the present invention to provide an air guide which provides sufficient rigidity for redirecting air in an efficient manner, while at the same provide improved behavior in the event of a crash.

According to a first aspect of the invention, there is provided an air guide for a vehicle front structure, the air guide is mountable on the vehicle front structure and is configured to redirect an incoming air flow towards a cooling device of the vehicle, the air guide including: a frame portion including a fixation portion having mounting elements for mechanical fixation to a vehicle structure when mounted for use, the frame portion is adapted to reinforce the air guide and define the general shape of the air guide, an air guide material, wherein the frame portion is over-molded with the air-guide material, wherein the stiffness of the frame portion is higher than the stiffness of the air guide material.

The present invention is based on the realization that an air guide may be comprised of a frame portion configured to provide sufficient stiffness for the air guide for ensuring that the air guide has a predetermined shape to ensure efficient air guidance. The invention is further based on the realization that the frame portion may be over-molded with an air guide material with lower stiffness than the stiffness of the frame portion. The frame portion thus ensures the correct shape and sufficient stiffness for the air guide, and the air guide material seals the open areas between the frame portion parts such that the air guide is able to redirect incoming air flow in a satisfactory manner. Accordingly, the air guide material ensures that the air guide is air tight across the frame portion.

The frame portion over-molded with the air guide material forms an air guide which holds together as a one piece air guide which may not easily be disassembled again. In other words, the over-molding of the frame portion ensures a one piece, air tight air guide.

Accordingly, the invention provides the advantage that an air tight air guide with low stiffness towards the forward direction of the vehicle (when the air guide is mounted in the vehicle) may be provided using less complicated assembly techniques. The low stiffness towards the forward direction provides reduced stack up and thus reduced risk of damages on the vehicle including the air guide or on foreign objects, or injuries on pedestrians, in particular at low speed in the case of a frontal collision.

A cooling device may generally serve to provide cooling fluid or cooled fluid to the engine or other systems such as an air conditioning system of the vehicle. For example, for one possible cooling device the cooling fluid exchanges heat with the engine and the heated fluid is returned to the cooling device where is it cooled by the inflow or air through the shutter. A cooling device may be generally known as a radiator for cooling a vehicle engine. Further, the cooling device may include a charged air cooler used for a turbo radiator, and a condenser. In case of an electric vehicle the cooling device may instead be used for cooling a battery pack for the electric vehicle.

An air guide is shaped and positioned to redirect incoming air flow towards the cooling device directly or indirectly. Often, a shutter unit is arranged between the air guide and the cooling device. A shutter unit may include flaps to control the air flow and to redirect the air flow coming from the air guide towards the cooling device. The flaps may be e.g. rectangular in shape and rotatable such as to close or open an inlet towards the outside surface of the cooling device. Thus, the flaps may for example block the air flow or allow the air flow through the shutter unit by a rotational movement of the flaps. The air guide may be formed as an air tight funnel.

The frame portion may be manufactured using injection molding. The frame portion may be over-molded with the air guide material using injection molding.

The fixation portion is the portion of the air guide which includes mounting elements so that the air guide can be mounted to a vehicle structure such as the vehicle chassis, the shutter, a beam, etc. The mounting elements may be flanges with catches which can b connected to a vehicle structure. The mounting elements may in other possible implementations include through-holes such that bolts, screws, rivets, etc. may be arranged through the though-holes to attach the air guide to the vehicle structure. Various possible ways of attaching the air guide to the vehicle structure exists and the invention should not be construed as limited to the ones mentioned herein.

According to an embodiment of the invention, the frame portion may include a plastic material and the air guide material may include a thermoplastic elastomer and/or a rubber material. The plastic material and the thermoplastic elastomer and/or a rubber material advantageously provide the desired stiffness properties, while at the same time allows for using the advantageous over-molding technique. The stiffness of the air guide material may be defined by its shore-hardness. The inventive concept advantageously provides for using an air guide material with relatively low shore-hardness.

According to an embodiment of the invention, the frame portion may include a plurality of interconnected elongated ribs separated by gaps larger than the width of the elongated ribs. The ribs separated by gaps advantageously provides a reinforcement structure which still allows the overall stiffness of the air guide at the ribs separated by gaps to be relatively low. Thus, the ribs separated by gaps provides for a larger amount of air guide material compared to the amount of frame portion material.

There are further possible frame portion configurations. For instance, the frame portion may include a pattern of reinforcing structures. The reinforcement structures may also in this case be provided as ribs.

The frame portion may thus be provided in many different configurations, each configured to provide stiffness for the air guide to maintain an overall shape during normal operation conditions, but collapse in a desirable way in the event of a collision affecting the air guide.

The fixation portion may be adapted to be arranged down stream of the incoming air flow compared to the location of an opposite air flow receiving portion, wherein the average stiffness of the air guide is higher on the frame portion side of the air guide compared to the stiffness of the air flow receiving portion. The fixation portion may advantageously be arranged on the side of the air guide intended to face the direction of the cooling device since the fixation portion preferably is relatively stiff to ensure a rigid attachment to the vehicle structure. Thus, the relatively stiff (compared to the air guide material) fixation portion is configured to be distally arranged from the front most part of the vehicle, where a collision could occur. In addition, it is easier to mount the air guide to the vehicle structure at the rear part of the air guide, downstream of the incoming air flow.

Accordingly, the fixation portion is adapted to be mountable facing towards the cooling device of the vehicle such that the less stiff side of the air guide faces in a forward direction of the vehicle, when in use.

There is further provided a vehicle including a cooling device and an air guide according to the inventive concept.

According to a second aspect of the invention, there is provided a method for manufacturing an air guide configured to redirect an incoming air flow towards a cooling device of the vehicle, the method including: providing a frame portion including a fixation portion having mounting elements for mechanical fixation to a vehicle part when mounted for use, the frame portion is adapted to reinforce the air guide and define the general shape of the air guide, over-molding the frame portion with an air guide material, wherein the stiffness of the frame portion is higher than the stiffness of the air guide material, whereby the frame portion is adapted to reinforce the air guide.

The frame portion may be manufactured by injection molding.

According to embodiments of the invention, the method may include: providing a machine configured to produce injection molding articles, manufacturing the frame portion in the machine, and over-molding the frame portion with the air guide material using the same machine. Thus, the frame portion production may advantageously be performed by the same machine as the over-molding step is performed, thereby facilitating the manufacturing of the air guide.

Furthermore, the over-molding the frame portion with the air guide material using the machine may be performed without removing the frame portion from the machine before the over-molding step is performed. Hereby, the manufacturing method is even further simplified.

This second aspect of the invention provides similar advantages as discussed above in relation to the previous aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

In the present detailed description, various embodiments of the system according to the present invention are mainly described with reference to a vehicle in the form of a car. However, the present invention may equally be used with other vehicles such as trucks, buses, etc., having need of an air guide. Thus, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

Figure 1:
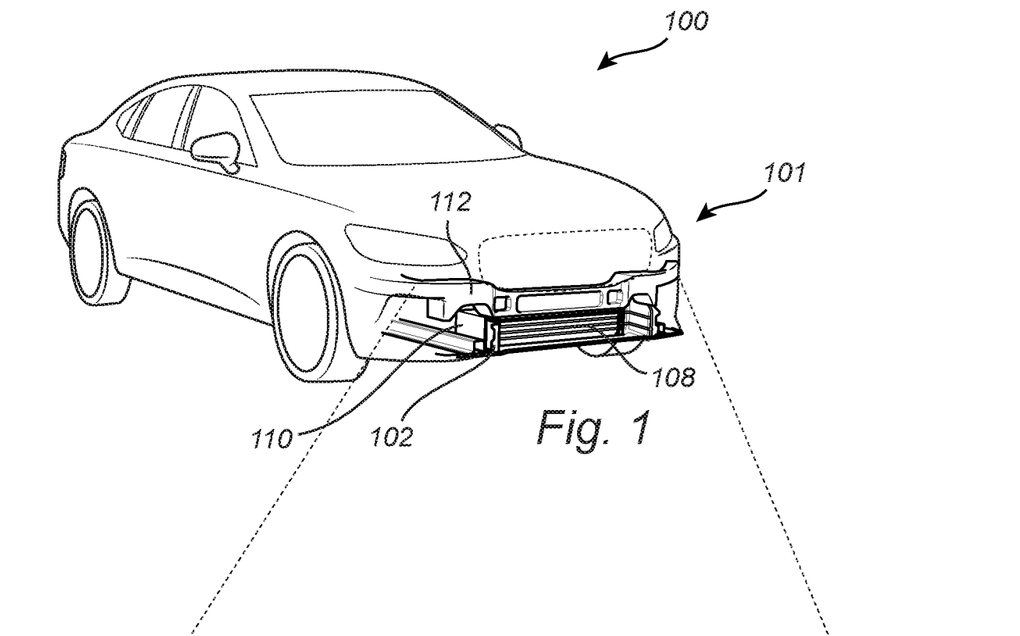
FIG. 1 conceptually illustrates a vehicle including an air guide and a cooling device.
Figure 2:
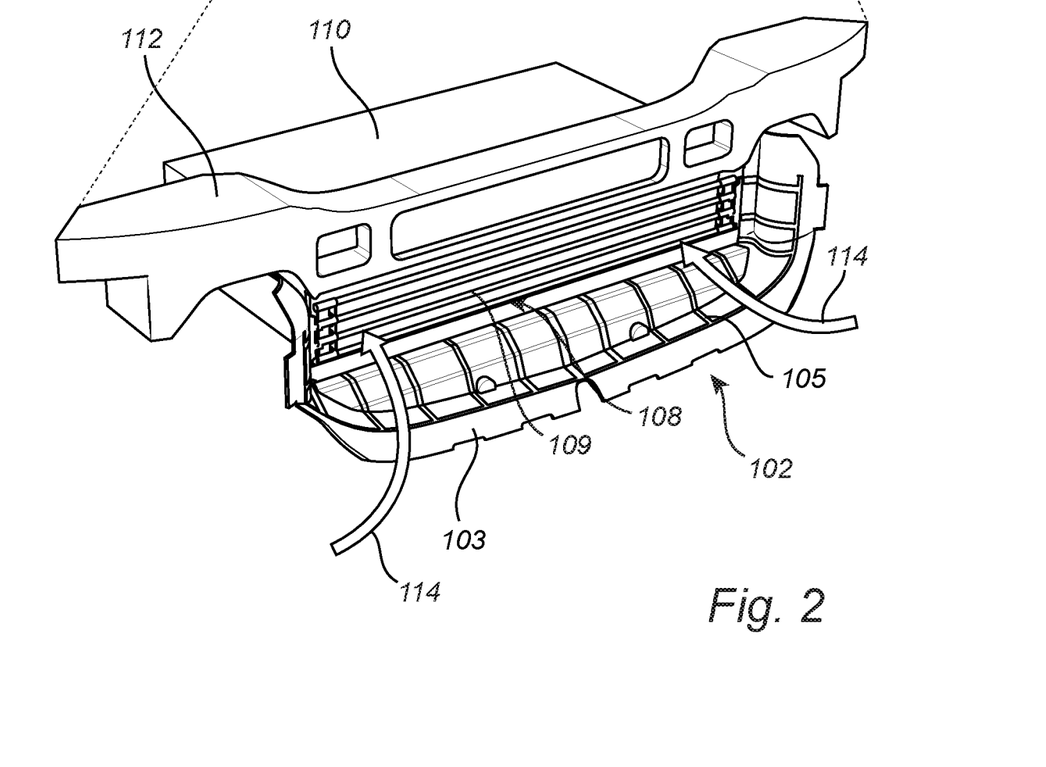
FIG. 2 is a close up view of the vehicle front structure included in FIG. 1.

FIG. 1 shows a vehicle 100 including a vehicle front structure 101. FIG. 2 illustrates a close-up view of the vehicle front structure in FIG. 1. The vehicle 100 includes a cooling device 110 arranged in the front structure 101. The cooling device 110 (e.g. a radiator) is generally used for cooling an engine or other areas such as the air conditioning functionality of the vehicle 100 by providing cooled fluid to the vehicle engine (or other areas). In one possible implementation, the engine exchanges heat with a cooling fluid, which thereby transports the heated cooling fluid back to the cooling device 110. In the cooling device 110, the cooling fluid is again cooled, and the cooling is at least partly accomplished by airflow from the forward direction of the vehicle. The airflow is generated when the vehicle 100 is travelling.

In this example vehicle 100 is a shutter unit 108 arranged in front of the cooling device 110, with regards to the forward travelling direction of the vehicle 100, to control the air flow to the cooling device 110. The shutter unit 108, may for example prevent the air flow from reaching the cooling device 110, or allow the air flow to flow through the shutter unit 108 and towards the cooling device 110. The shutter unit 108 may include flaps 109 (see FIG. 2) having a generally rectangular cross-section that are arranged to redirect the air flow (e.g. prevent or allow the air flow to pass to the cooling unit 110). The flaps are rotatable about an axis for preventing or allowing air to pass through the shutter unit 108. In this particular example is the shutter unit 108 and the air guide 102 arranged below a crash beam 112 of the vehicle front structure 101. The shutter unit 108 may also gradually control the amount of air flow that reaches the cooling device 110.

An air guide 102 in accordance with the inventive concept is arranged to redirect the air flow (indicated by arrows 114) coming from the forward traveling direction towards the shutter unit 108. The air guide 102 includes a frame portion 105 and an air guide material 103 and will be described in more detail with reference to subsequent drawings.

The air guide 102 may have a funnel shape (i.e. tapered shape) with the narrower side arranged towards the shutter unit 108. The air guide 102 may further be arranged with an air tight seal between the shutter unit 108 and the air guide such that air flow does not leak passed the shutter unit 108 when the shutter unit 108 is closed.

In front of the shutter unit 108 and the air guide 104 there may be a grill (not shown) which is air permeable to allow the air flow to flow through the grille towards the air guide 102.

Figure 3A:
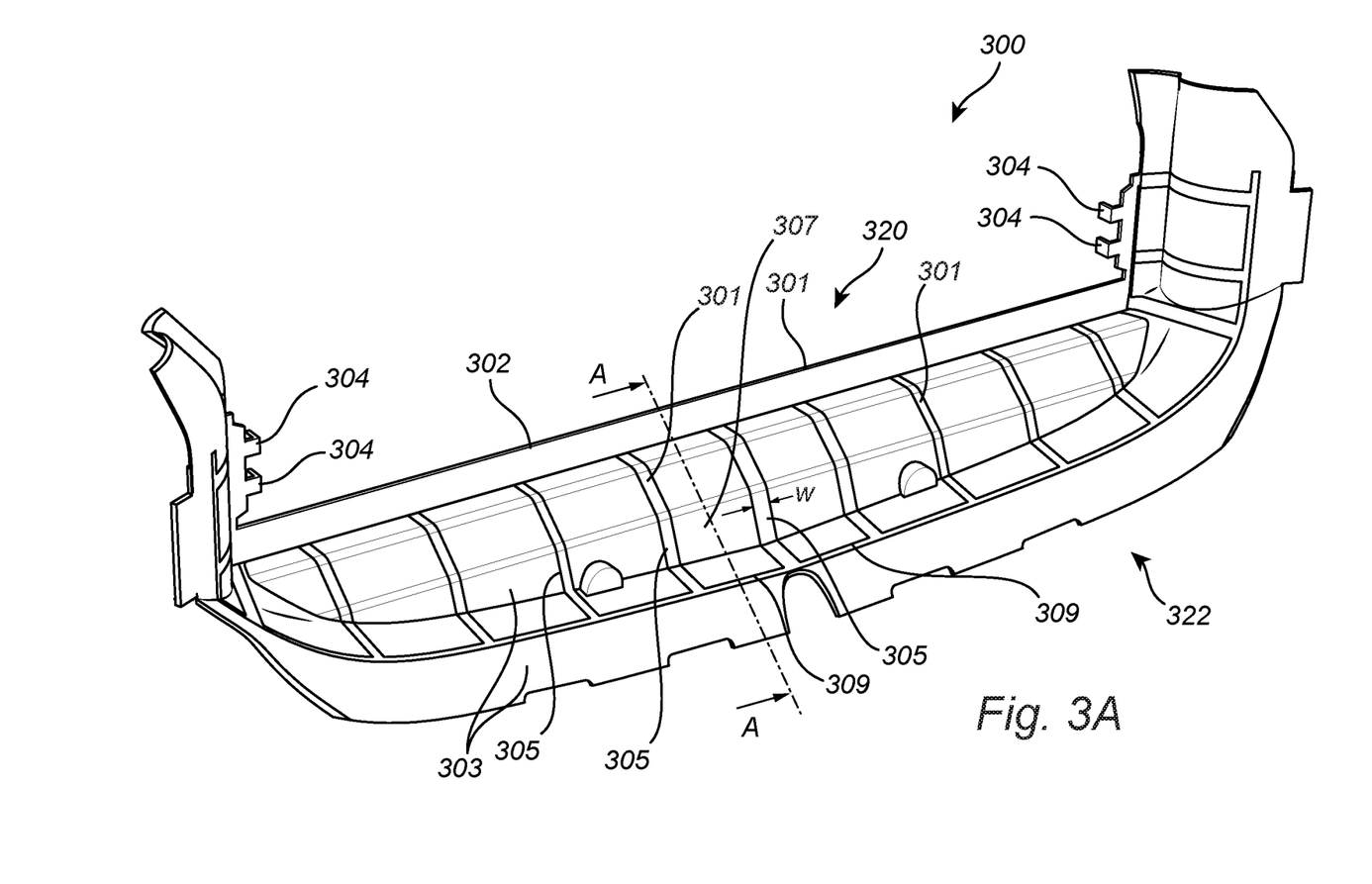
FIG. 3A conceptually illustrates an example air guide according to embodiments of the invention.
Figure 3B:
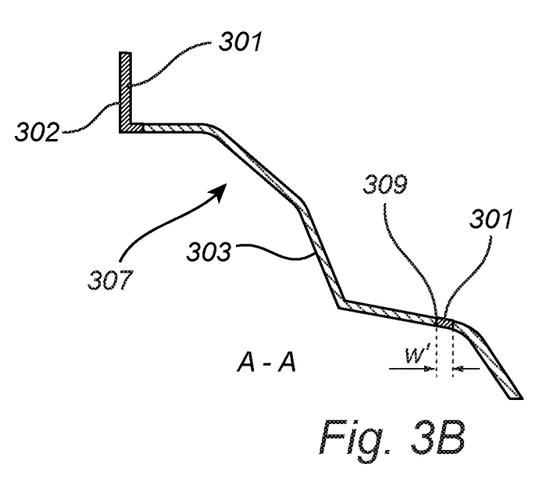
FIG. 3B is a cross-section of the example air guide illustrated in FIG. 3A.

FIG. 3A conceptually illustrates an example air guide 300 according to embodiments of the invention and a cross-section of the air guide 300 is shown in FIG. 3B. The air guide 300 includes a frame portion 301 having a fixation portion 302. The fixation portion includes mounting elements 304 for allowing the air guide 300 to be mechanically fixated to a vehicle structure. The mounting elements may be provided in various forms.

Attachment means for attaching an air guide to a vehicle is known per se to the skilled person. The mounting elements are in this example embodiment illustrated as a plurality of flanges 304 configured as catches to be connected to a vehicle structure. The air guide 300 may further be attached using bolts or screws, or clips, tightened/attached to a vehicle structure. The vehicle structure may for example be the vehicle chassis, the shutter, or a beam. In some possible implementations is the shutter 108 and the air guide 300 integrated as a single unit.

The frame portion 301 is over-molded with an air guide material 303. The stiffness of the frame portion 301 is higher than the stiffness of the air guide material 303. Thus, the frame portion 301 defines the general shape of the air guide 300 and additionally reinforces the air guide 300 by its higher stiffness than the air guide material 303.

In the example embodiment shown in FIG. 3A-B, the frame portion 301 includes a plurality of interconnected elongated ribs 305 (not all are numbered) separated by gaps 307. A transverse rib 309 is connected to the ribs 305 for interconnecting them. The gaps 307 (only one is numbered) between the ribs 305 are larger than the width (w, w') of the ribs 305, 309, on at least a portion of the air guide (i.e. not necessarily across the entire air guide 300). Thus, the ribs 305 separated by the gaps 307 provides for a larger amount of air guide material 303 compared to the amount of frame portion 301 material, thereby providing an air guide 300 with relatively low stiffness but still with maintained shape for normal operation for redirecting air.

The fixation portion 302 is adapted to be arranged down stream of the incoming air flow (114, se FIG. 2) compared to the location of an opposite air flow receiving portion 322. Thereby, the average stiffness of the air guide 300 is higher on the frame portion side 320 of the air guide compared to the stiffness of the air flow receiving portion 322.

The example air guide 300 illustrated in FIG. 3A-B includes elongated ribs 305 and 309 which form a generally rectangular pattern, i.e. the gaps 307 are generally rectangular. For instance, at least some of the ribs 305 may be parallel. However, many other configurations of the elongated ribs are possible.

For example, the frame portion may include reinforcement structures such as ribs in a pattern as is illustrated in FIGS. 4A-D, over molded with the air guide material 303. The pattern of ribs may be designed to provide desirable physical properties such that a desirable behavior is obtained in the event of a crash collapsing the air guide 400.

Figure 4A:
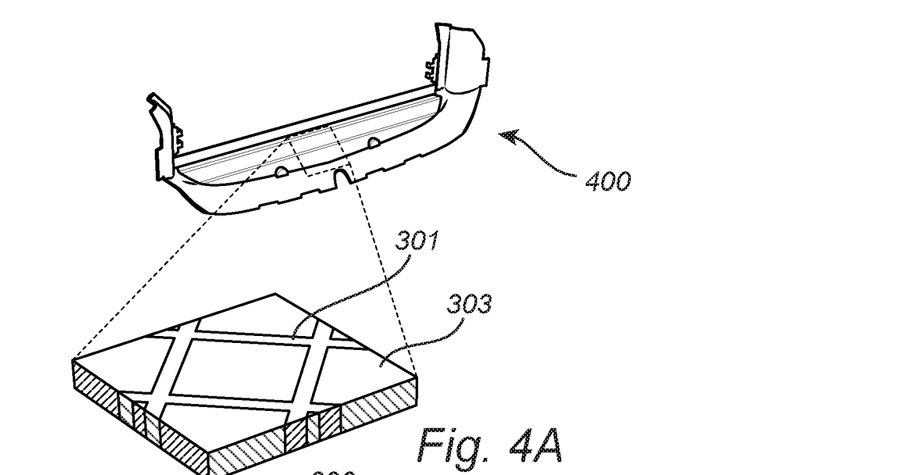
FIG. 4A conceptually illustrates an example pattern of reinforcement structures for an air guide according to embodiments of the invention.

FIG. 4a illustrates a frame portion 401a including a pattern of reinforcement structures 306 in the form of ribs 306. The pattern of the ribs 306 is a rectangular pattern which is rotated by an angle with respect to the ribs 305 of the air guide 300 in FIG. 3. Thus, the frame portion pattern may be rotated but still provide the desired function.

Figures 4B, 4C, 4D:
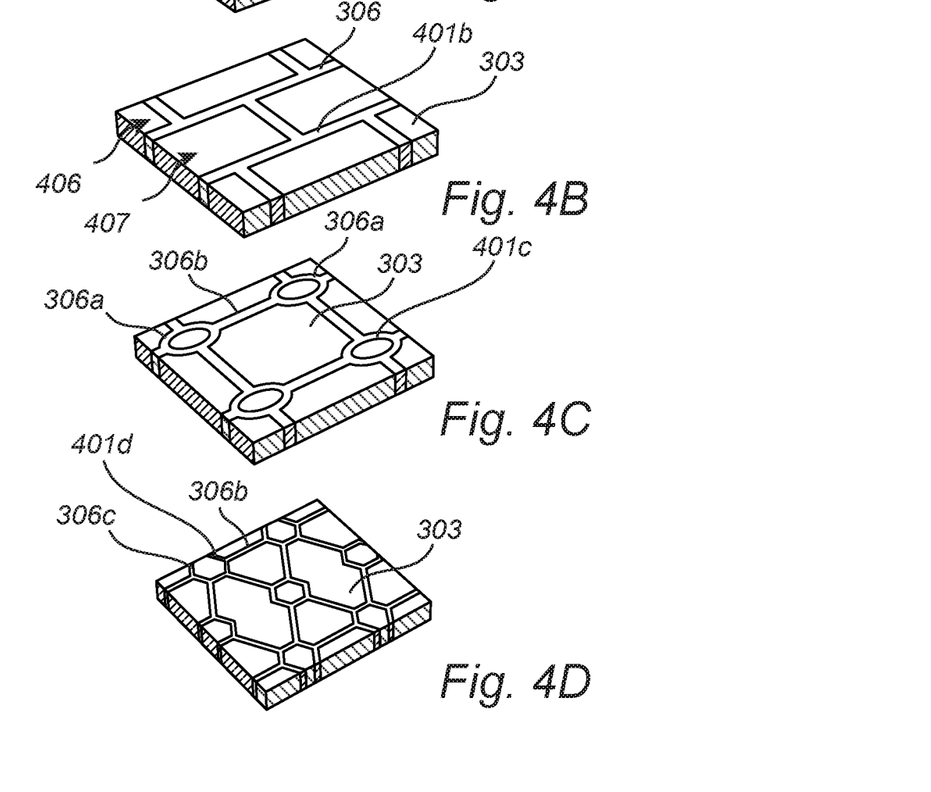
FIG. 4B conceptually illustrates an example pattern of reinforcement structures for an air guide according to embodiments of the invention.
FIG. 4c conceptually illustrates an example pattern of reinforcement structures for an air guide according to embodiments of the invention.
FIG. 4D conceptually illustrates an example pattern of reinforcement structures for an air guide according to embodiments of the invention.

FIG. 4B illustrates a further possible pattern for a frame portion 401b including a rectangular pattern in which some of the rectangles of the pattern have been displaced with respect to others. For example, a first row 406 of rectangles is displaced with respect to the adjacent row 407, thereby causing rectangles to partly overlap.

FIG. 4C illustrates a further possible pattern for a frame portion 401c including pattern of reinforcement structures 306a with circular or oval shape which are interconnected by straight segments of reinforcement structures 306b.

FIG. 4d illustrates a further possible pattern for a frame portion 401d including polygonal portions of reinforcement structures 306c interconnected by straight segments of reinforcement structures 306b.

Accordingly, the frame portion in accordance with the inventive concept may be provided in various shapes and forms.

It is further noted that the frame portions illustrated herein are illustrated to be visible through or on the air guide material. However, the frame portion may equally well be fully embedded in the air guide material.

The frame portion in the above embodiments may include a plastic material and the air guide material may include a thermoplastic elastomer and/or a rubber material.

Figure 5:
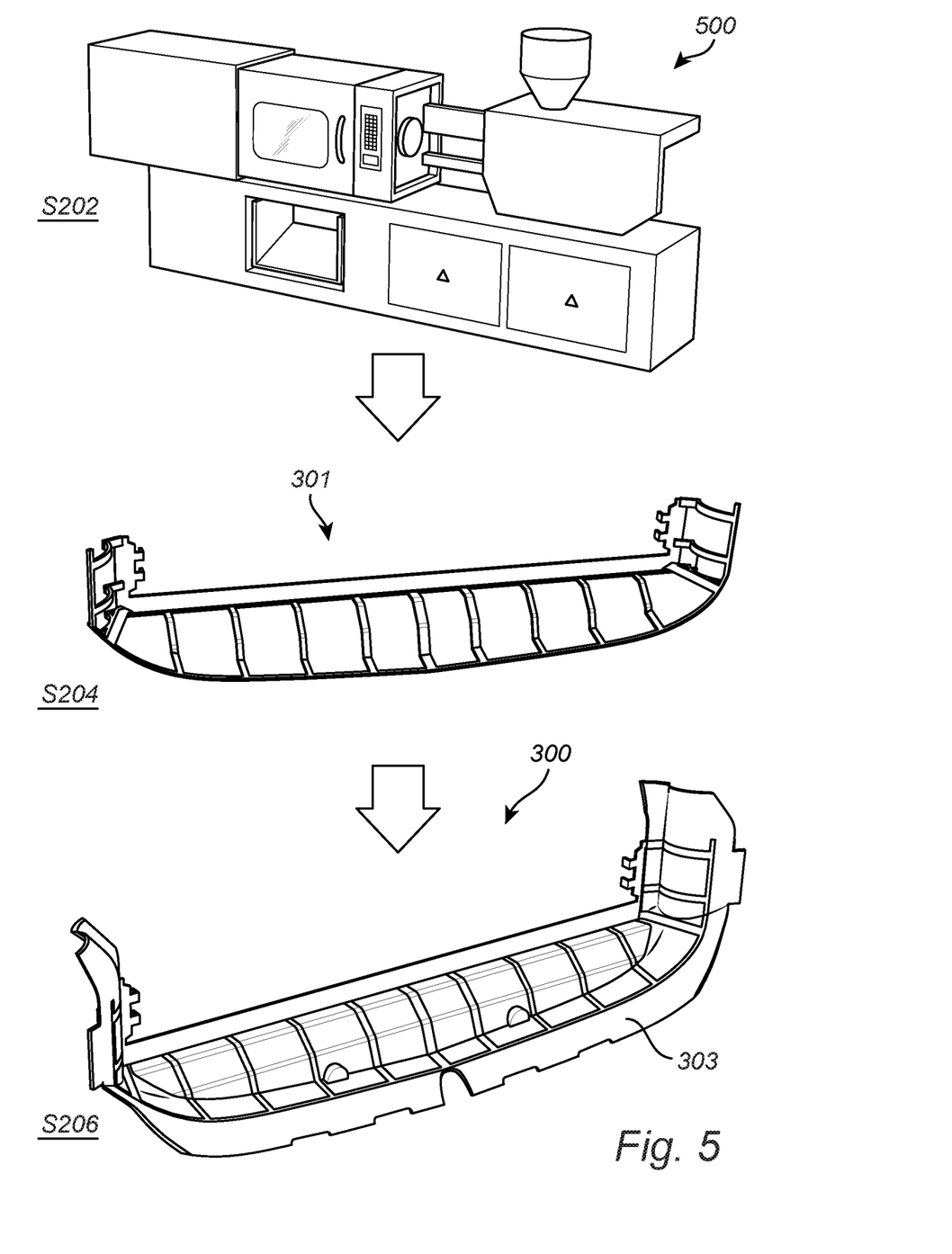
FIG. 5 conceptually illustrate a manufacturing flow for manufacturing an air guide.

FIG. 5 schematically illustrates a manufacturing flow for manufacturing an air guide according to the inventive concept. Firstly (S202) is a machine 500 provided configured to produce injection molding articles. Next, in step S204 is the frame portion (e.g. frame portion 301) manufactured using the machine. Subsequently, in step S206 is the frame portion over-molded in the same injection molding machine with an air guide material 303. The frame portion 301 may advantageously be manufactured and over-molded with the air guide material in a single manufacturing flow without the need for removing the frame portion from the injection molding machine 500. The molding machine 500 may be a so-called two component injection molding machine.

For instance, first is a frame portion produced from a plastic material, and subsequently is the frame portion over-molded with the air guide material which may be a thermoplastic elastomer or a rubber material, advantageously but not necessarily without removing the frame portion from the injection molding machine.

Figure 6:
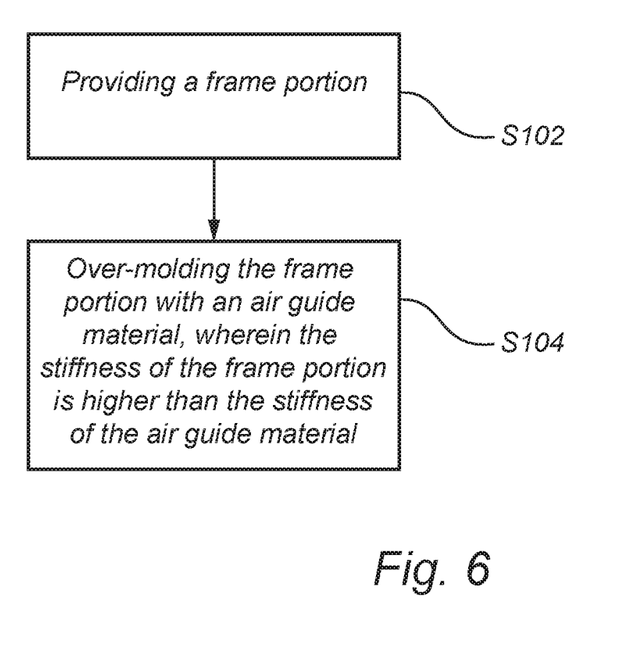
FIG. 6 is a flow chart of method steps according to embodiments of the invention.

FIG. 6 is a flow-chart of method steps according to embodiments of the invention. In step S102 is a frame portion is provided including a fixation portion having mounting elements for mechanical fixation to a vehicle part when mounted for use, the frame portion is adapted to reinforce the air guide and define the general shape of the air guide. Subsequently is the frame portion over-molded S104 with an air guide material, wherein the stiffness of the frame portion is higher than the stiffness of the air guide material.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An air guide for a vehicle front structure, the air guide is mountable on the vehicle front structure and is configured to redirect an incoming air flow towards a cooling device of the vehicle, the air guide comprising:
a frame portion comprising a fixation portion having mounting elements for mechanical fixation to a vehicle structure when mounted for use, the frame portion is adapted to reinforce the air guide and define the general shape of the air guide, and
an air guide material, wherein the frame portion is over-molded with the air-guide material to seal open areas in the frame portion, wherein the stiffness of the frame portion is higher than the stiffness of the air guide material.

2. The air guide according to claim 1, wherein the frame portion comprises a plastic material and the air guide material comprises one or more of a thermoplastic elastomer and a rubber material.

3. The air guide according to claim 1, wherein the frame portion comprises a plurality of interconnected elongated ribs separated by gaps larger than the width (w, w') of the elongated ribs.

4. The air guide according to claim 1, wherein the frame portion comprises a pattern of reinforcing structures.

5. The air guide according to claim 1, wherein the fixation portion is adapted to be arranged down stream of the incoming air flow compared to the location of an opposite air flow receiving portion, wherein the average stiffness of the air guide is higher on the frame portion side of the air guide compared to the stiffness of the air flow receiving portion.

6. The air guide according to claim 1, wherein the fixation portion is adapted to be mountable facing towards the cooling device of the vehicle such that the less stiff side faces in a forward direction of the vehicle, when in use.

7. A vehicle comprising a cooling device and an air guide according to claim 1.

* * * * *